United States Patent
Lambert et al.

(10) Patent No.: US 10,242,291 B2
(45) Date of Patent: Mar. 26, 2019

(54) DEVICE FOR PROCESSING IMAGES OF PEOPLE, THE DEVICE SEEKING TO SORT THESE IMAGES AS A FUNCTION OF CONTEXTUAL INFORMATION

(71) Applicant: SAFRAN IDENTITY & SECURITY, Issy les Moulineaux (FR)

(72) Inventors: Laurent Lambert, Issy les Moulineaux (FR); Marie Jarlegan, Issy les Moulineaux (FR); Laurent Rostaing, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 5 days.

(21) Appl. No.: 15/427,652

(22) Filed: Feb. 8, 2017

(65) Prior Publication Data
US 2018/0225506 A1    Aug. 9, 2018

(51) Int. Cl.
*G06K 9/00* (2006.01)
*G06K 9/32* (2006.01)
*G06K 9/62* (2006.01)

(52) U.S. Cl.
CPC ....... *G06K 9/6215* (2013.01); *G06K 9/00228* (2013.01); *G06K 9/00926* (2013.01); *G06K 9/3258* (2013.01)

(58) Field of Classification Search
CPC .......... G06K 9/00268; G06K 9/00288; G06K 9/00926; G06K 9/6212; G06K 9/6215; G06K 9/72; G06K 9/46; G06K 9/3233; G06K 2009/00953; G06K 2009/3291; G06T 2207/30201; G06T 2207/10016
See application file for complete search history.

(56) References Cited

U.S. PATENT DOCUMENTS

| | | | | |
|---|---|---|---|---|
| 2011/0150280 A1* | 6/2011 | Tsuji | .............. | G06T 7/248 382/103 |
| 2013/0216136 A1* | 8/2013 | Kita | .............. | G06K 9/46 382/195 |
| 2013/0329964 A1* | 12/2013 | Nishi | .............. | G06K 9/00362 382/110 |
| 2014/0285477 A1* | 9/2014 | Cho | .............. | G09G 3/2003 345/207 |
| 2015/0213328 A1* | 7/2015 | Mase | .............. | G06K 9/4642 382/201 |

* cited by examiner

*Primary Examiner* — Ali Bayat
(74) *Attorney, Agent, or Firm* — Muncy, Geissler, Olds & Lowe, P.C.

(57) ABSTRACT

An image processor device includes a computer processor unit (CPU), at least one memory connected to the CPU, and device for transferring images to the CPU. The memory contains an image-processing program for processing images showing at least one person. The program performs the following operations: detecting at least a face in each image and extracting therefrom a biometric template of the face; for each image, storing in a database an image reference, the biometric template, and if possible context information for the image; comparing the biometric templates corresponding to different image references with one another and associating together the image references for which the comparison has a similarity score greater than a predetermined threshold; and searching for context information corresponding to at least one of the references of the associated images, and if there is corresponding context information, establishing a link between the associated images.

18 Claims, 1 Drawing Sheet

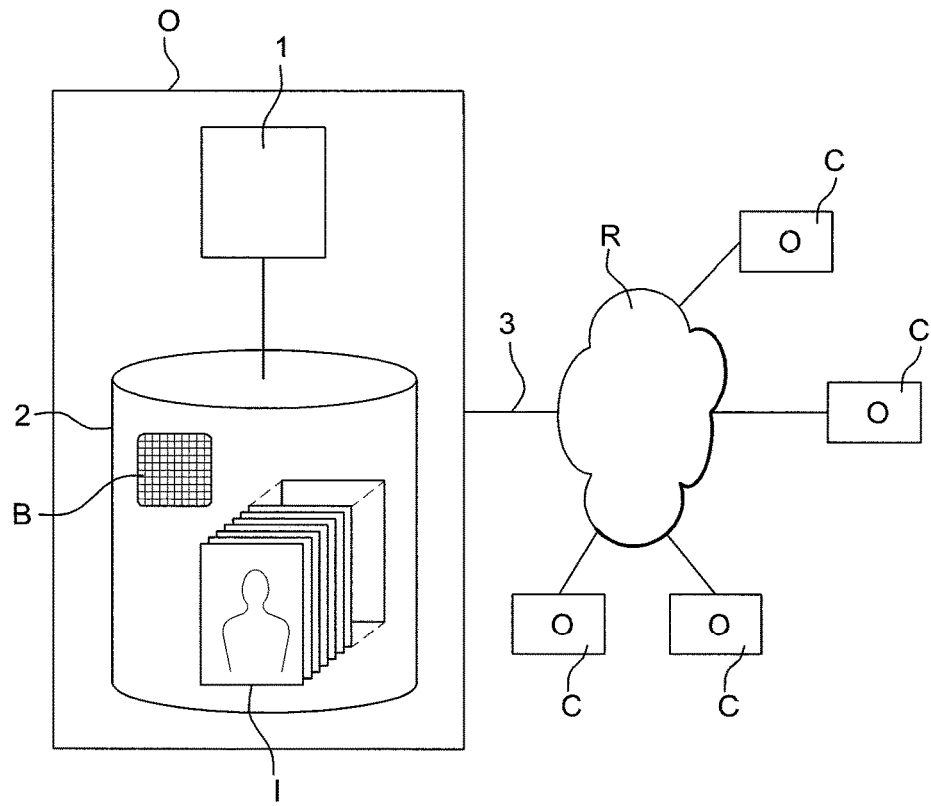
Fig. 1
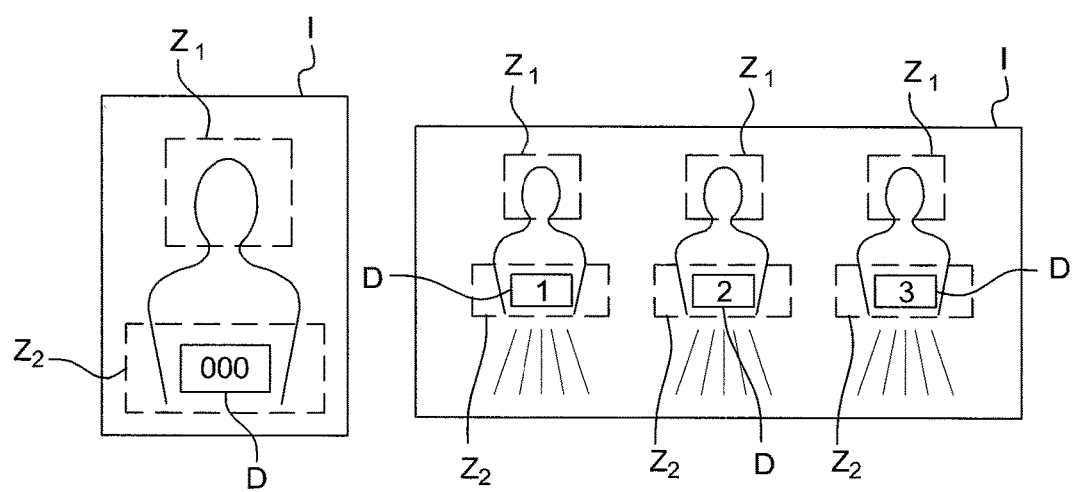
Fig. 2  Fig. 3

DEVICE FOR PROCESSING IMAGES OF PEOPLE, THE DEVICE SEEKING TO SORT THESE IMAGES AS A FUNCTION OF CONTEXTUAL INFORMATION

BACKGROUND OF THE INVENTION

Field of the Invention

The present invention relates to processing images.

Brief Discussion of the Related Art

It can happen, in particular for sports events, that provision is made to photograph the participants and subsequently to enable them to access, and possibly to purchase, the photographs in which they appear. That does not lead to difficulties for sports events of small size, such as local or even regional competitions: the relatively small number of photographs is collected together and the participants can scan through all of them rapidly so as to identify themselves in the photographs that concern them.

However, during mass sporting events, e.g. of national or international reputation, such as marathons in major capitals, the number of photographs taken during the event amount to several hundreds of thousands. That makes it impossible for the participants to scan through all of the photographs in order to pick out the photographs in which they appear.

Proposals have been made to sort the photographs automatically by using sorting algorithms based on the numbers that each of the participants to a sporting competition normally wear. Nevertheless, it frequently happens that the numbers are partially or completely masked by parts of the participant's body, or by other runners, or that they can become folded or crumpled because of the movements of the runners wearing them so that they are not fully readable. In addition, the photographs may happen to contain other numbers (e.g. telephone numbers on an advertising panel behind the runners), thereby disturbing detection of the numbers worn by the runners in the photographs.

SUMMARY OF THE INVENTION

According to the invention, there is provided an image processor device comprising a computer processor unit, at least one memory connected to the computer processor unit, and means for transferring images to the computer processor unit, the memory containing an image-processing program for processing images, each of which theoretically shows at least one person. The image-processing program is executable by the computer processor unit and being arranged so that the processor unit performs the following operations:

in each image of a group of images received by the computer processor unit, detecting at least a face and extracting biometric template therefrom;

for each image, storing in a database an image reference, the biometric template of each face detected in the image, and if possible context information for the image;

comparing the biometric templates corresponding to different image references with one another and associating together the image references for which the comparison has a similarity score greater than a predetermined threshold; and searching for context information corresponding to at least one of the references of the associated images, and if there is any corresponding context information, establishing a link between the associated images on the basis of that context information.

The context information may be extracted from the image, e.g. a visual identifier appearing in the image (for example a number), or relating to the conditions in which the image was taken (more particularly time-stamp data for when the image was taken). Thus, even if the context information is present in only one of the images representing each person, the invention makes it possible to search through all of the images of that person on the basis of the context information.

In a particular implementation, each image represents at least one person wearing a visual identifier of predetermined format, the identifier forming the context information, the image-processing program is arranged so that the processor unit then performs the following operations:

in each image, detecting a face and extracting therefrom biometric characteristics of the face, and detecting at least one identifier;

for each image, storing the biometric template of each face detected in the image and each complete identifier extracted from the image in the database;

comparing the biometric templates corresponding to different image references with one another and associating together the image references for which the comparison presents a similarity score greater than the predetermined threshold;

searching to discover whether at least one of the image references that are associated together corresponds to a complete identifier of the person appearing in said images, and if so, establishing a link between the images that are associated together on the basis of the identifier.

Advantageously, during the detection of the identifier, the image-processing program searches either the complete identifier if it is completely visible or a bigger visible portion thereof, and the image-processing program is arranged for:

storing in the database the complete identifier or the visible portion thereof;

at least when none of the image references that are associated together corresponds to an identifier of the person appearing in said images, assembling together the visible identifier portions stored in the database in relationship with the image references that are associated together in order to reconstitute as completely as possible the identifier corresponding to the person appearing in said images.

Thus, even when the complete identifier is not visible in any of the images, the invention makes it possible to reconstitute the identifier from a plurality of images. A person seeking to access the images that have been taken of that person needs to search only through images on the basis of that person's own identifier.

Other characteristics and advantages of the invention appear on reading the following description of particular, non-limiting implementations of the invention.

BRIEF DESCRIPTION OF THE DRAWINGS

Reference is made to the accompanying figures, in which:

FIG. 1 is a diagrammatic view of the device of the invention, which device is common to both implementations described below;

FIG. 2 is an image showing a person; and

FIG. 3 is an image showing a group of people.

DETAILED DESCRIPTION OF THE PREFERRED EMBODIMENTS

With reference to FIG. 1, the image processor device 0 comprises a computer processor unit 1, at least one memory 2 connected to the computer processor unit 1, and means 3 for transferring data to the computer processor unit 1. The computer processor unit 1 in this example comprises one or more processors arranged to execute computer programs enabling the processor unit 1 to process data. In particular, the processing involves in particular calculations, e.g. for filtering, for geometrical transformations, for conversions, for comparisons, for making selections, . . . . The data is made up of digital values, words, images such as photographs, . . . . The memory 2 comprises a random access memory (RAM) for temporarily loading the program that is to be executed and also the data for processing, and a long-term memory for containing the data durably. In this example, the means 3 for transferring data to the computer processor unit 1 comprise a connection to a computer network R enabling data to be transferred between the network R and the computer processor unit 1. In this example, the computer network R is of the Internet type, but it could equally well be an internal network. In a variant, the means 3 may merely comprise a connector enabling a camera to be connected to the computer processor unit 1.

The memory 2 contains a program for processing images, each of which theoretically shows at least one person, the image-processing program being executable by the computer processor unit 1.

In a first implementation, a group of images I is available, specifically photographs captured by a plurality of cameras C, showing people present at a location, and taken from different viewpoints in the location and at different moments, the people being present in a predetermined order in front of a predetermined camera from among the cameras C.

The purpose of the image-processing program is to sort the images in order to associate with one another all of the images of each person and in order to establish a link between those images on the basis of the order number. This order number constitutes context information.

In this example, the images I are loaded into the memory 2 of the device together with the camera data, and in particular the time and the date the image was taken, and an identifier of the camera.

The image-processing program is arranged so that the computer processor unit 1 performs the following operations:

in each image I of the group of images I received by the computer processor unit 1, detecting at least one first image zone that contains a face and extracting biometric characteristics of the face from the first image zone;

for each image, storing in a database B an image reference, the biometric characteristics of each face detected in the image I, and if possible context information for the image;

comparing the biometric characteristics corresponding to different image references with one another and associating together the image references for which the comparison has a similarity score greater than a predetermined threshold; and searching for context information corresponding to at least one of the references of the associated images, and if there is any corresponding context information, establishing a link in the database B between the associated images on the basis of that context information.

In this example, the image reference is a unique identifier of the image enabling each image from the images of the group of images to be identified.

In practice, biometric characteristics are extracted by transforming the image zone showing a face into a binary file representing a digital description of the face (this is usually referred to as a "template" in English).

The context information is a number giving the order in which people go past the predetermined camera from among the cameras C. This passing order number is specified in the database initially in relationship with the image references for images taken by the predetermined camera.

The comparison is performed by means of a biometric recognition algorithm (or "algorithm of templates matching") that is itself known. Broadly, the biometric templates are compared with one another in order to give a score as a function of their similarity. The threshold is determined as a function of the desired accuracy:

the higher the threshold, the greater the probability that two biometric templates be similar with each other; and the lower the threshold, the greater the probability of two biometric templates be dissimilar.

The database B is stored in the memory 2 of the processor device 0. The database B, once it has been filled in, can be interrogated on the basis of the order number in order to find all of the images relating to the person corresponding to that order number.

In a second implementation, a group of images I is made available, and in this example once again photographs taken by a plurality of cameras C showing runners participating in a competition and each wearing an identifier. In this example, the identifier is in the form of a number usually pinned to a front portion of each runner's vest (see FIGS. 2 and 3).

The image processing program performs a processing method seeking to sort these images I in order to associate with one another images of each individual by establishing a link between these images of each individual on the basis of that individual's number. The individual's number constitutes context information.

The image-processing program is arranged so that the processor unit 1 performs the following operations:

in each image contained in the memory 2, detecting a first image zone Z1 containing a face and extracting therefrom biometric characteristics of the face, and detecting at least one second image zone Z2 containing an identifier and extracting therefrom either the complete identifier if it is visible in full, or else a portion of the identifier that is as large as possible;

for each image, storing the biometric characteristics of each face detected in the image and each complete identifier or visible identifier portion in the identifier extracted from the image I in the database B;

comparing the biometric characteristics corresponding to different image references with one another and associating together the image references for which the comparison presents a similarity score greater than the predetermined threshold;

searching to discover whether at least one of the image references that are associated together corresponds to a complete identifier of the person appearing in said images, and if so, establishing a link in the database B between the images that are associated together on the basis of the complete identifier; and at least in the negative, assembling together the visible identifier portions stored in the database in relationship with the image references that are associated together in order to reconstitute as completely as possible the identifier corresponding to the person appearing in said images, and storing the reconstituted identifier in the database for each of the images having image references that have been associated together.

The identifiers are extracted by using a character recognition algorithm that is itself known.

If the cameras C are controlled so as to take images only with the same framing, it is possible to simplify detection of the second zone Z2 by limiting the search to a portion of the image. For example, for a full shot image, the second zone Z2 is substantially halfway up, whereas for a medium shot or an American shot, the second zone Z2 is substantially at the bottom of the image.

Since the identifiers D are marked on a background of predetermined shape and color, the image-processing program is arranged to search in the images I for the shape and/or color of the background in order to locate the second image zone Z2.

Since the identifiers that have been allocated to the people are known, the image-processing program is arranged to search in the images I for identifiers that have indeed been allocated.

In order to further accelerate detection of the identifier, the image-processing program is advantageously arranged to search for the second image zone Z2 starting from the position of the first image zone Z1. The number D is normally to be found below the face: the second image zone Z2 is thus below the first image zone Z1.

When a plurality of faces and a plurality of identifiers are detected in the same image (as in FIG. 3), provision is made to allocate the identifiers to the faces as a function of the relative positions of the identifiers and the faces: the identifier is associated with the face below which it appears.

In a variant of the invention, the image-processing program is arranged to perform the steps of randomly determining an encryption key, of performing homomorphic encryption by using the same encryption key on all of the extracted biometric characteristics, of storing in the database the biometric characteristics in encrypted form only, and of deleting the encryption key once all of the biometric characteristics have been encrypted. Homomorphic encryption is a permutation of the values of the binary file forming the biometric template: since this permutation is the same for all of the images, the similarity score calculated by comparing two encrypted biometric templates is the same as the score that would be calculated by comparing two non-encrypted biometric templates. The advantage is that once the encryption key has been deleted, it is difficult to discover what the non-encrypted biometric templates were, such that merely accessing the database B does not give any simple access to the personal data of the runners. The images I may be stored in some other memory that is more secure. For example, the images I are not stored in the processor device, and the database B is returned to the photographer who took the images I.

Naturally, the invention is not limited to the implementations described but covers any variant coming within the definition of the invention appearing in the accompanying claims.

The memory of the processor device may be defined by one or more data media such as hard disks or integrated circuits (flash or solid state drive (SSD) type memories).

The memory of the processor device may be remote from the computer processor unit, or it may be incorporated in the same housing.

The search for biometric characteristics and/or for identifiers may be performed on images that have already been stored in the memory 2 or progressively on receiving a stream of images.

In a variant, the image-processing program is arranged to search for the second image zone halfway up each image.

The invention claimed is:

1. An image processor device comprising a computer processor unit, at least one memory connected to the computer processor unit, and means for transferring images to the computer processor unit, the memory containing an image-processing program for processing images, each of which theoretically shows at least one person, the image-processing program being executable by the computer processor unit and being arranged so that the processor unit performs the following operations:
   in each image of a group of images received by the computer processor unit, detecting at least a face and extracting therefrom a biometric template of the face;
   for each image, storing in a database an image reference, the biometric template of each face detected in the image, and if possible context information for the image, the context information being extracted from the image, or relating to the conditions in which the image was taken;
   comparing the biometric templates corresponding to different image references with one another and associating together the image references for which the comparison has a similarity score greater than a predetermined threshold; and
   searching for context information corresponding to at least one of the references of the associated images, and if there is any corresponding context information, establishing a link between the associated images on the basis of that context information.

2. An image processor device comprising a computer processor unit, at least one memory connected to the computer processor unit, and means for transferring images to the computer processor unit, the memory containing an image-processing program for processing images, each of which theoretically shows at least one person, the image-processing program being executable by the computer processor unit and being arranged so that the processor unit performs the following operations:
   in each image of a group of images received by the computer processor unit, detecting at least a face and extracting therefrom a biometric template of the face, and detecting if possible a context information in each image,
   each image representing at least one person wearing a visual identifier of predetermined format, the identifier forming the context information;
   for each image, storing in the database an image reference, the biometric template of each face detected in the image and each identifier,
   comparing the biometric templates corresponding to different image references with one another and associating together the image references for which the comparison presents a similarity score greater than the predetermined threshold;
   searching to discover whether at least one of the image references that are associated together corresponds to an identifier of the person appearing in said images, and if so, establishing a link between the images that are associated together on the basis of the identifier.

3. An image processor device comprising a computer processor unit, at least one memory connected to the computer processor unit, and means for transferring images to the computer processor unit, the memory containing an image-processing program for processing images, each of which theoretically shows at least one person, the image-processing program being executable by the computer processor unit and being arranged so that the processor unit performs the following operations:

in each image of a group of images received by the computer processor unit, detecting at least a face and extracting therefrom a biometric template of the face, and detecting if possible a context information in each image, each image representing at least one person wearing a visual identifier of predetermined format, the identifier forming the context information;

for each image, storing in the database an image reference, the biometric template of each face detected in the image and each identifier;

comparing the biometric templates corresponding to different image references with one another and associating together the image references for which the comparison presents a similarity score greater than the predetermined threshold;

searching to discover whether at least one of the image references that are associated together corresponds to an identifier of the person appearing in said images, and if so, establishing a link between the images that are associated together on the basis of the identifier; wherein during the detection of the identifier, the image-processing program searches either the complete identifier if it is completely visible or a bigger visible portion thereof, and the image-processing program is arranged for:

storing in the database the complete identifier or the visible portion thereof;

at least when none of the image references that are associated together corresponds to an identifier of the person appearing in said images, assembling together the visible identifier portions stored in the database in relationship with the image references that are associated together in order to reconstitute as completely as possible the identifier corresponding to the person appearing in said images.

4. The device according to claim 2, wherein the identifiers actually allocated to the people are known, and the image-processing program is arranged to search in the images for identifiers that have actually been allocated.

5. The device according to claim 2, wherein the identifiers are worn on a medium of predetermined shape and color, and the image-processing program is arranged to search for the shape and/or color of that medium in order to locate the identifier in the image.

6. The device according to claim 2, wherein the image-processing program is arranged to search the identifier in the image from a position of the face in each image.

7. The device according to claim 2, wherein the image-processing program is arranged to search the identifier halfway up in each image.

8. The device according to claim 1, wherein the image-processing program is arranged to perform a step of randomly determining an encryption key, of homomorphically encrypting all of the biometric templates by means of the encryption key, of storing the biometric templates in encrypted form only in the database, and of deleting the encryption key once all of the biometric templates have been encrypted.

9. An image processor device comprising a computer processor unit, at least one memory connected to the computer processor unit, and means for transferring images to the computer processor unit, the memory containing an image-processing program for processing images, each of which theoretically shows at least one person, the image-processing program being executable by the computer processor unit and being arranged so that the processor unit performs the following operations:

in each image of a group of images received by the computer processor unit, detecting at least a face and extracting therefrom a biometric template of the face;

for each image, storing in a database an image reference, the biometric template of each face detected in the image, and if possible context information for the image, the context information being the order in which people pass in front of a first camera, the order of passing being indicated in the database in association with the image reference of the first image to be taken;

comparing the biometric templates corresponding to different image references with one another and associating together the image references for which the comparison has a similarity score greater than a predetermined threshold; and searching for context information corresponding to at least one of the references of the associated images, and if there is any corresponding context information, establishing a link between the associated images on the basis of that context information.

10. The device according to claim 3, wherein the identifiers actually allocated to the people are known, and the image-processing program is arranged to search in the images for identifiers that have actually been allocated.

11. The device according to claim 3, wherein the identifiers are worn on a medium of predetermined shape and color, and the image-processing program is arranged to search for the shape and/or color of that medium in order to locate the identifier in the image.

12. The device according to claim 3, wherein the image-processing program is arranged to search the identifier in the image from a position of the face in each image.

13. The device according to claim 3, wherein the image-processing program is arranged to search the identifier halfway up in each image.

14. The device according to claim 2, wherein the image-processing program is arranged to perform a step of randomly determining an encryption key, of homomorphically encrypting all of the biometric templates by means of the encryption key, of storing the biometric templates in encrypted form only in the database, and of deleting the encryption key once all of the biometric templates have been encrypted.

15. The device according to claim 3, wherein the image-processing program is arranged to perform a step of randomly determining an encryption key, of homomorphically encrypting all of the biometric templates by means of the encryption key, of storing the biometric templates in encrypted form only in the database, and of deleting the encryption key once all of the biometric templates have been encrypted.

16. The device according to claim 1, wherein the context information is a visual identifier appearing in the image.

17. The device according to claim 16, wherein the visual identifier is a number.

18. The device according to claim 1, wherein the conditions are time-stamp data indicating when the image was taken.

* * * * *